United States Patent [19]

Lessig, III

[11] Patent Number: 4,853,575
[45] Date of Patent: Aug. 1, 1989

[54] TACHOMETER GENERATOR

[75] Inventor: William R. Lessig, III, Hunt Valley, Md.

[73] Assignee: Black & Decker Inc., Newark, Del.

[21] Appl. No.: 646,140

[22] Filed: Aug. 31, 1984

[51] Int. Cl.$^4$ .................................... H02K 17/42
[52] U.S. Cl. ..................... 310/171; 310/43; 310/89; 310/155; 310/168; 310/194; 324/173; 324/174
[58] Field of Search ............... 310/168, 155, 156, 152, 310/46, 218, 194, 171, 43, 71, 89, 47, 50; 324/164, 173, 174; 336/110, 135, 198

[56] References Cited

U.S. PATENT DOCUMENTS

| | | |
|---|---|---|
| 1,325,354 | 12/1919 | Dean . |
| 1,846,678 | 2/1932 | Ferrell . |
| 1,849,831 | 3/1932 | Hewlett . |
| 2,090,521 | 8/1937 | Brodersen . |
| 2,325,927 | 8/1943 | Wilbur . |
| 2,740,110 | 3/1956 | Trimble . |
| 2,890,357 | 6/1959 | Clark, Jr. .................. 310/218 X |
| 2,978,599 | 4/1961 | Wilcox . |
| 2,993,161 | 7/1961 | Steele . |
| 3,085,170 | 4/1963 | Brown . |
| 3,134,918 | 5/1964 | Eichenberger . |
| 3,158,033 | 11/1964 | Cohen . |
| 3,230,407 | 1/1966 | Marsh, Jr. . |
| 3,458,741 | 7/1969 | Woodward . |
| 3,482,120 | 12/1969 | Riordan . |
| 3,492,518 | 1/1970 | Wayne . |
| 3,504,538 | 4/1970 | Andrews . |
| 3,515,921 | 6/1970 | De Lange . |
| 3,562,741 | 2/1971 | McEvoy . |
| 3,564,312 | 2/1971 | Bunea . |
| 3,564,313 | 2/1971 | Goor . |
| 3,566,170 | 2/1971 | Rehklau . |
| 3,597,644 | 8/1971 | Preece ..................... 310/218 X |
| 3,641,429 | 2/1972 | Cox, Jr. . |
| 3,652,887 | 3/1972 | Taubitz . |
| 3,676,765 | 7/1972 | Westcott . |
| 3,688,306 | 8/1972 | Oishi . |
| 3,721,968 | 3/1973 | Gee . |
| 3,728,565 | 4/1973 | O'Callaghan . |
| 3,758,859 | 9/1973 | Damijonaitis . |
| 3,782,136 | 1/1974 | Ploppa . |
| 3,796,899 | 3/1974 | Giachello . |
| 3,930,201 | 12/1975 | Ackermann . |
| 3,946,482 | 3/1976 | Marsh . |
| 3,952,220 | 4/1976 | Staudt . |
| 3,961,214 | 6/1976 | Lockkart . |
| 3,967,200 | 6/1976 | Tetsugu . |
| 3,979,617 | 9/1976 | Thom . |
| 3,984,713 | 10/1976 | Presley . |

(List continued on next page.)

FOREIGN PATENT DOCUMENTS

| | | |
|---|---|---|
| 1913843 | 12/1970 | Fed. Rep. of Germany . |
| 2811746 | 10/1978 | Fed. Rep. of Germany ...... 324/174 |
| 1484055 | 5/1966 | France . |
| 2515357 | 10/1982 | France . |
| 1306100 | 2/1973 | United Kingdom . |

*Primary Examiner*—R. Skudy
*Attorney, Agent, or Firm*—Harness, Dickey & Pierce

[57] ABSTRACT

A tachometer generator of the inductive pickup variety is disclosed, particularly adapted to be mounted in close proximity with a rotating multipole permanent magnet structure. The coil produces a voltage output proportional to the rate of change and magnitude of the magnetic flux of the rotating magnet. In accordance with this invention, an inductive pickup is disclosed having a core piece which acts as a conduction path for the magnetic field of the rotating magnet and further acts as a means for mounting the inductive pickup within the associated structure. Lead wires are imbedded within the bobbin and form protruding central conductors which act as posts to which each end of the coil wires are electrically and mechanically attached. The lead wires and core piece components are insert molded such that they are loaded into an injection molding die prior to the introduction of plastic material in a molten state which forms the bobbin component. The lead wire is sharply bent within the bobbin to insure firm engagement between the lead wire and bobbin. The tachometer generator according to this invention is simple and inexpensive to manufacture, and provides accurate installed positioning thereby enhancing performance.

18 Claims, 1 Drawing Sheet

U.S. PATENT DOCUMENTS 4,027,182  5/1977   Sprinkle .
4,056,748  11/1977  Cross, Jr. .
4,061,938  12/1977  Hashimoto .
4,082,968  4/1978   Jones .
4,087,710  5/1978   Von Fabris .
4,121,112  10/1978  Hartig .
4,159,433  6/1979   Takayama .
4,159,434  6/1979   Kalsi .
4,222,263  9/1980   Armstrong .
4,256,986  3/1981   Anderson .
4,258,279  3/1981   Hovorka .
4,268,771  5/1981   Lace .
4,276,489  6/1981   Dron .
4,284,916  8/1981   Onodera .
4,647,892  3/1987   Hewitt ................................ 336/110

TACHOMETER GENERATOR

BACKGROUND AND SUMMARY OF THE INVENTION

This invention relates to a tachometer generator and particularly, to such a device of the inductive pickup variety adapted to provide an electrical output signal responsive to a changing magnetic field.

Tachometer generators are employed in widespread applications with mechanical devices. Tachometer generators are used, for example, to measure the speed of rotation of a shaft, to sense shaft movement, or to provide an indication of the direction of rotation of a shaft. One type of tachometer generator is the so-called inductive pickup variety. These devices are used in connection with a rotating magnet, usually of the permanently magnetized variety. As the magnet rotates in proximity with a magnetic core piece of the tachometer generator, a closed magnetic circuit is created. Positioned around the core member of the generator is a coil having multiple turns of conductive wire. In accordance with Faraday's Law, an induced electromotive force (voltage or e.m.f.) is produced when the coil of wire is exposed to a magnetic flux which changes with respect to time. The magnitude of the induced voltage is proportional to the number of turns of wire used, the magnetic flux density, and the rate of change of that magnetic flux. The intensity of the flux is a function of the magnetic circuit path and the magnetic characteristics (reluctance) of the materials within the magnetic circuit path. By employing a rotating multipole permanent magnet positioned in close proximity with the stationary tachometer generator device, an alternating current output is produced as the core member is exposed to alternating poles of the magnet as it is rotated. This alternating current output can be processed according to well-known principles to generate a signal which is a function of the angular speed of the rotating magnet.

Tachometer generators of the inductive variety are well-known according to the art. This invention, however, improves over prior art designs by providing a structure which is simple in construction, reliable and inexpensive to manufacture. Such advantages are particularly desirable when using such devices with portable electric tools such as drill motors, with which this invention is particularly advantageously employed. These advantages are derived from several design features of a tachometer generator constructed in accordance with this invention. The core member of the tachometer generator described herein has a pair of extending legs which provides means for accurately positioning the tachometer generator within the associated structure. Additionally, a pair of lead wires have exposed conductor ends which form posts to which the coil wires are attached, thereby eliminating the necessity of providing a separate post component. Further, the lead wires and core member are made integrally with a coil bobbin of the tachometer generator by injection molding the bobbin material around the lead wires and core member which are first inserted into an injection molding die cavity. The lead wires are bent within the bobbin to enhance the mechanical engagement between the lead wires and bobbin.

Additional benefits and advantages of the present invention will become apparent to those skilled in the art to which this invention relates upon a reading of the described preferred embodiment of this invention taken in conjunction with the accompanying drawings.

DETAILED DESCRIPTION OF THE INVENTION

Figure 1:
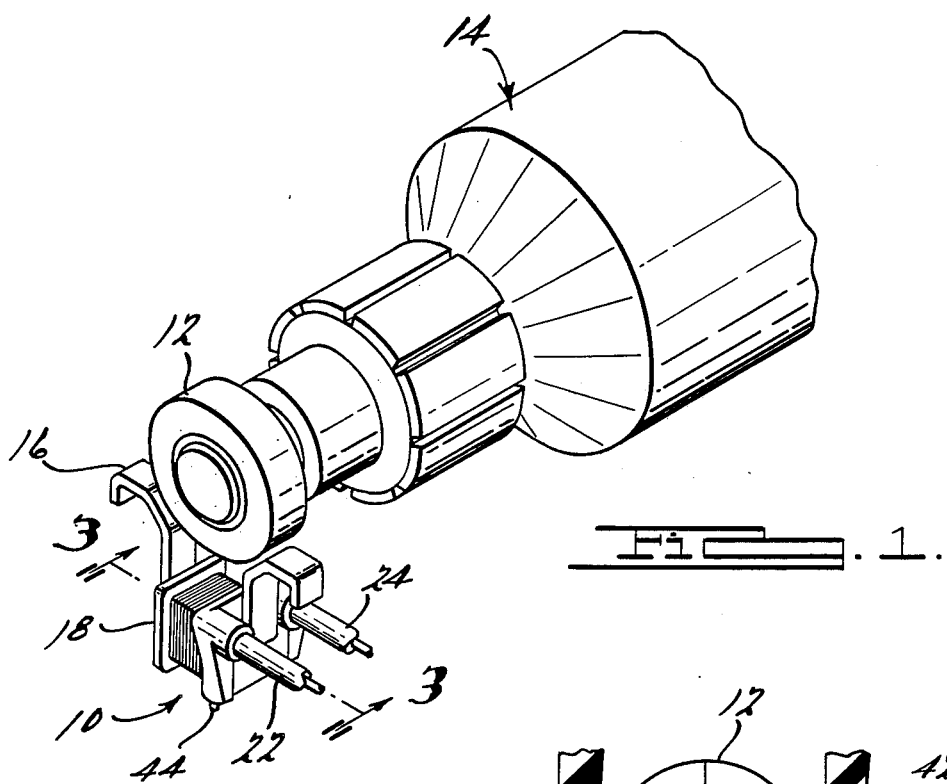
FIG. 1 is a pictorial view of a tachometer generator according to this invention shown in conjunction with a permanent magnet which rotates with an armature of a universal type electric motor.

A tachometer generator of the inductive variety according to this invention is shown by each of the figures and is generally designated by reference character 10. FIG. 1 shows tachometer generator 10 positioned adjacent permanent magnet 12 which rotates with armature assembly 14. Armature assembly 14 is shown for exemplary purposes only. Permanent magnet 12 could be attached to any rotating shaft within a portable or stationary machine. Moreover, magnet 12 could be replaced by an electromagnet or any type of device which creates a magnetic field. Tachometer generator 10 has three major components; core piece 16, bobbin 18 and coil wire 20.

Figure 2:
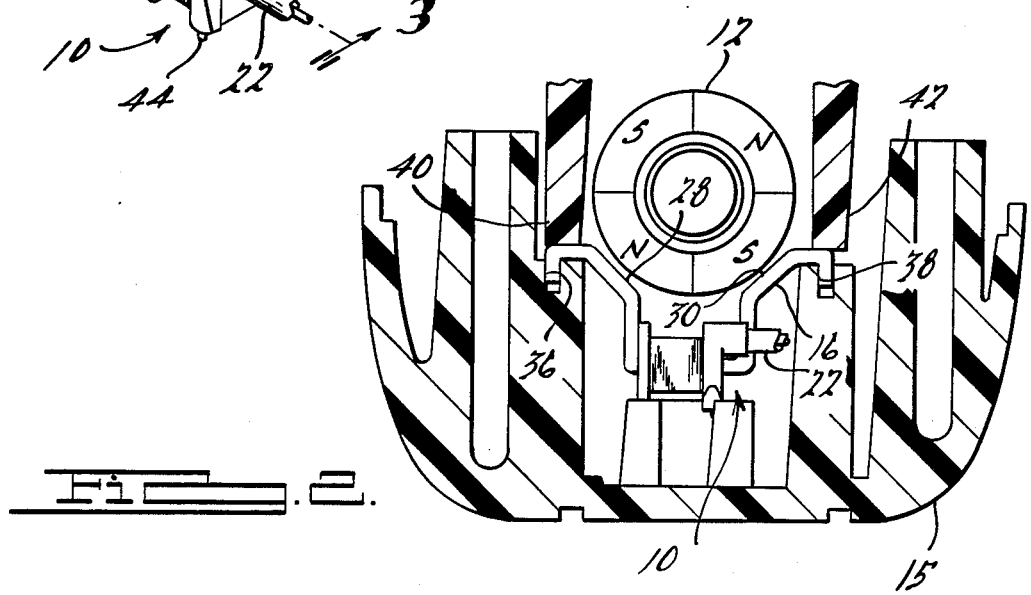
FIG. 2 is a cross-sectional view of an exemplary device employing a rotating magnet and a tachometer generator according to this invention further showing means by which the tachometer generator is mounted within the device housing.
Figure 3:
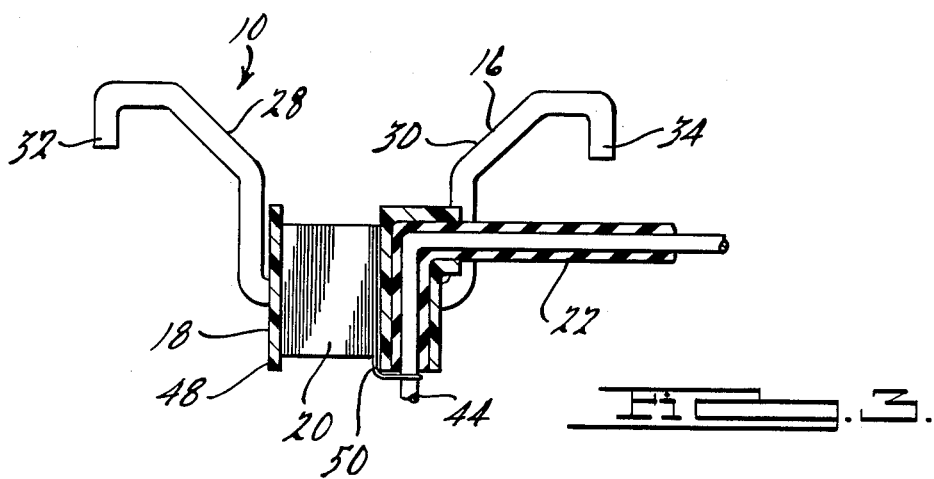
FIG. 3 is a cross-sectional view taken along line 3—3 of FIG. 1 particularly showing the positioning and configuration of the lead wires within the bobbin structure of the tachometer generator.

The configuration of core piece 16 is best shown with reference to FIGS. 2 and 3. Core piece 16 is preferably constructed from flat sheet metal stock and from a metal having a high magnetic permeability characteristic. Core piece 16 has a generally straight center section (not shown) which passes through bobbin 18. Core piece 16 further forms a pair of face surfaces 28 and 30 and terminates in a pair of legs 32 and 34. Core piece 16 can be preformed to the shape described and shown and thereafter installed within an injection molding die cavity where material which makes up bobbin 18 is injected in a fluid state around the core piece. Alternately, core piece 16 can be partially deformed and then inserted within a bore formed by bobbin 18. If bobbin 18 is made from a multipiece assembly, the individual parts can be bonded around core piece 16. As shown by FIG. 2, legs 32 and 34 are provided to enable tachometer generator 10 to be precisely located within an associated structure relative to permanent magnet 12. In addition, as shown by FIG. 2, legs 32 and 34 are positioned within housing grooves 36 and 38 and are retained within the grooves by contact with posts 40 and 42. In view of the severe space constraints which typically exist within a power tool housing 15, it will be appreciated that the present tachometer generator 10, to be adaptable to such applications, must be small in size. It necessarily follows, therefore, that the number of turns of wire 20 on bobbin 18 and hence the sensitivity of tachometer generator 10 will be limited. Consequently, to function properly and to provide a signal of adequate magnitude within the desired range of motor armature speeds, the spacing between core piece 16 of tachometer generator 10 and permanent magnet 12 becomes critical. In fact, a variation in excess of one millimeter in the size of the air gap between magnet 12 and core piece 16 can result in an inoperative device. Accordingly, it will be appreciated that tachometer generator 10 according to the present invention provides an inexpensive and convenient means for precisely locating core piece 16 of tachometer generator 10 relative to permanent magnet 12 during assembly of tool. Note also, that the housing structure for mounting of tachometer generator 10 is described for illustrative purposes only. Numerous other means for securing the core piece 16 within an associated tool housing structure could be employed with equal success.

As shown by FIG. 2, face surfaces 28 and 30 are positioned in close proximity with the outer cylindrical surface of permanent magnet 12. Magnet 12 is preferably of the multipole variety such that, at certain angular positions of the magnet, face surfaces 28 and 30 are exposed to opposing magnetic poles. At the angular position of magnet 12 shown in FIG. 2, face surface 28 is exposed to a north magnetic pole whereas face surface 30 is exposed to a south magnetic pole. As is evident from an inspection of the figure, as magnet 12 rotates, the poles to which face surfaces 28 and 30 are exposed will reverse. Such reversal in poles to which the faces are exposed causes a reversal in the direction of the closed magnetic field which is transmitted through core piece 16, magnet 12, and the air gaps therebetween. Such reversal in the sense of the magnetic field generates a change in the magnetic flux through the core with respect to time. This flux reversal, according to Faraday's Law described previously, generates an induced voltage within coil wires 20. Since air gaps have low magnetic permeability as compared with magnetic materials, it is desirable to minimize the size of the air gaps while assuring that the gaps exist, thereby avoiding mechanical interference between permanent magnet 12 and face surfaces 28 and 30. The configuration of core piece 16, as described above, provides a means for very accurately and repeatably positioning both face surfaces 28 and 30 with respect to magnet 12. Such accuracy in positioning is achieved since legs 32 and 34 provide the mounting points for tachometer generator 10 and these surfaces are in a predetermined relationship with respect to face surfaces 28 and 30.

Bobbin 18 is preferably made from a polymeric plastic material and provides a form for wrapping of coil wire 20. Bobbin 18 further has a pair of radially extending flanges 48 and 50 which prevent the coil wire from slipping off the bobbin. Core piece 16 may be installed within a bore formed by bobbin 18 or the bobbin can be molded around the core piece. Additionally, bobbin 18 can be made in two parts which are bonded together around core piece 16. Bobbin 18 is made of an electrically non-conductive material and provides a form for the winding of coil wire 20. A pair of lead wires 22 and 24 are attached to bobbin 18 and have central conductors which are electrically connected to the two ends of coil wire 20.

Lead wires 22 and 24 are covered with an electrical insulation material and have exposed conductor ends 44 and. Lead wires 22 and 24 are preferably molded directly into bobbin 18 by an insert molding process. As shown by FIG. 3, lead wire 22 has a bent end such that exposed conductor end 44 extends beyond the surface of bobbin 18, thereby forming a post to which coil wire 20 is attached. Similarly, lead wire 24 forms a protruding conductor end thereby forming a post for connection of the other end of coil wire 20. By bending lead wires 22 and 24 and insert molding them with bobbin 18, these wires are firmly engaged within bobbin 18. These bends should be sharp bends of approximately 90 degrees, as shown by FIG. 3. The construction described avoids the necessity of providing separate electrical terminal components which provide posts for attachment of the ends of coil wire 20 and as means for fixing and connecting lead wires 22 and 24.

While preferred embodiments have been described herein, it will be appreciated that various modifications and changes may be made without departing from the spirit and scope of the appended claims.

What is claimed is:

1. A tachometer generator for generating an electrical signal in response to a changing magnetic field comprising:
   a core piece;
   a nonconductive bobbin fitting around a portion of said core piece;
   at least one lead wire molded within said bobbin, said lead wire having an end with an exposed electrical conductor extending from said bobbin, the embedded portion of said lead wire forming a relatively sharp bend within said bobbin, thereby firmly engaging said bobbin; and
   a coil winding wrapped on said bobbin and having an end exterior to said bobbin directly attached to said exposed electrical conductor end.

2. A tachometer generator according to claim 1 wherein said changing magnetic field is provided by a rotatable, multipole permanent magnet.

3. A tachometer generator according to claim 1 further including a pair of legs extending from said core piece and exteriorly of said bobbin for positioning said generator relative to a magnet in said magnetic field, and wherein a pair of said lead wires are attached to said bobbin, so as to form a bend of approximately 90 degrees within said bobbin, and said lead wires have exposed electrical conductors which are connected to ends of said coil winding.

4. The tachometer according to claim 1 wherein said tachometer generator is adapted for use within a tool housing and said changing magnetic field results from rotation of a permanent magnet which rotates with an armature assembly.

5. A tachometer generator for generating an electrical signal in response to rotation of a multipole permanent magnet comprising:
   a core piece comprising a continuous piece of elongated stock that is formed to provide a substantially straight center section, and a pair of legs emanating from either side of said straight center section and having face surfaces that define an included angle of approximately 90 degrees, said face surfaces adapted to be positioned close to said magnet and constrained from rotating relative to said permanent magnet;
   a nonconductive bobbin fitting around said core piece center section;
   at least one lead wire attached to said bobbin; and
   a coil winding wrapped on said bobbin and connected to said lead wire.

6. A tachometer generator according to claim 5 wherein said core piece is formed from sheet metal stock.

7. A tachometer generator according to claim 5 wherein said legs have end portions defining mounting means for mounting said tachometer generator.

8. A tachometer generator according to claim 5 wherein said tachometer generator is adapted for use within a tool housing and said changing magnetic field results from rotation of a permanent magnet which rotates with an armature assembly.

9. A tachometer generator for generating an electrical signal in response to rotation of a multipole permanent magnet coupled to an armature assembly comprising:
- a core piece made from a continuous piece of elongated stock that is formed to provide a substantially straight center section, a pair of legs defining face surfaces and a pair of ends, said pair of legs being configured so that said face surfaces are positioned close to said magnet and said ends being configured to provide mounts for said tachometer generator;
- a molded bobbin fitting around said core piece center section;
- at least one lead wire encased within said bobbin, said lead wire having an end with an exposed electrical conductor extending from the bobbin molding; and
- a coil winding wrapped on said bobbin and having an end directly attached to the end of said exposed electrical conductor.

10. A tachometer generator according to claim 9 wherein a pair of lead wires are attached to said bobbin, and said lead wires having exposed electrical conductors which are connected to ends of said coil winding.

11. A tachometer generator according to claim 9 wherein said lead wire forms a relatively sharp bend within said bobbin, thereby firmly engaging said bobbin.

12. A tachometer generator according to claim 9 wherein a portion of said lead wire is encased within said bobbin and said exposed electrical conductor protrudes from said bobbin.

13. A tachometer generator according to claim 9 wherein said core piece is formed from sheet metal stock.

14. A tachometer generator according to claim 9 wherein said tachometer generator is adapted for use within a tool housing.

15. A tachometer generator for generating an electrical signal in response to rotation of a multipole permanent magnet coupled to an armature assembly comprising a pair of insulated electrical lead wires and a core piece each partially embedded in a body of polymeric material, and an electrical coil wrapped around said material and including a pair of coil ends, said core piece comprising a continuous piece of elongated stock that is formed to provide a substantial straight center section and a pair of legs each extending exteriorly from said material and including a face surface and defining mounting means for mounting the generator such that the face surfaces are in close proximity to said magnet, each coil end being electrically connected to an electrical conductor in one respective lead wire.

16. The tachometer generator as recited in claim 15 wherein said core piece includes a straight portion and a pair of upright portions each upright portion having opposite ends wherein one and the other end of each said upright portion is connected, respectively, to said straight portion and one respective leg, the upright portions being exteriorly of the polymeric material.

17. The tachometer generator as recited in claim 16 wherein said face surfaces define an included angle of approximately 90 degrees.

18. The tachometer generator as recited in claim 17 wherein the partially embedded portion of each lead wire undergoes substantially 90 degrees of change in direction to inhibit external forces from disturbing the electrical connection between each conductor and its respective coil end.

* * * * *